United States Patent [19]

MacLennan et al.

[11] Patent Number: 5,364,639
[45] Date of Patent: Nov. 15, 1994

[54] BEER MAKING METHOD

[76] Inventors: Ian M. MacLennan, 1670 - 138B St., White Rock, British Columbia, Canada; Clifford B. Hewson, 2251 Bellevue Ave., West Vancouver, British Columbia, Canada, V7V 1C5

[21] Appl. No.: 95,499

[22] Filed: Jul. 26, 1993

Related U.S. Application Data

[63] Continuation of Ser. No. 800,863, Nov. 26, 1991, abandoned, which is a continuation of Ser. No. 442,305, Nov. 27, 1989, abandoned.

[51] Int. Cl.$^5$ .............................. C12C 11/04
[52] U.S. Cl. ..................... 426/16; 426/11; 426/477; 426/592
[58] Field of Search ............. 426/13, 16, 28, 29, 426/477, 7, 8, 11, 12, 590, 592

[56] References Cited

U.S. PATENT DOCUMENTS

| | | |
|---|---|---|
| 275,134 | 4/1883 | Burton . |
| 1,033,136 | 7/1912 | Wennersten . |
| 2,593,770 | 4/1952 | Kollsman ..................... 99/323.1 |
| 3,528,817 | 9/1970 | Barrett et al. . |
| 3,760,711 | 9/1973 | Webster ....................... 99/277.1 |
| 3,852,495 | 12/1974 | Schmipf et al. ............ 426/13 X |
| 3,946,780 | 3/1976 | Sellers . |
| 4,038,420 | 7/1977 | Pollock et al. ..................... 426/16 |
| 4,218,964 | 8/1980 | Beadle ........................... 99/275 |
| 4,222,972 | 9/1980 | Caldwell . |
| 4,267,940 | 5/1981 | Wade ............................ 220/320 |
| 4,343,824 | 8/1982 | Caldwell . |
| 4,399,744 | 8/1983 | Ogden ......................... 99/323.1 |
| 4,423,670 | 1/1984 | Tenison . |
| 4,754,698 | 7/1988 | Naish . |
| 4,929,452 | 5/1990 | Hamdy .................... 426/16 X |

FOREIGN PATENT DOCUMENTS

| | | |
|---|---|---|
| 27551 | of 1903 | United Kingdom . |
| 28877 | of 1912 | United Kingdom ............. 99/276 |
| 922200 | 3/1963 | United Kingdom .......... 220/4.24 |
| 2123850 | 2/1984 | United Kingdom . |

OTHER PUBLICATIONS

Potter, N. N., Food Science, Third Edition, 1978, pp. 578-583, AVI Publishing Co., Inc., Westport, Conn.

*Primary Examiner*—Donald E. Czaja
*Assistant Examiner*—Leslie Wong
*Attorney, Agent, or Firm*—Neil F. Markva

[57] ABSTRACT

A method for making beer includes use of a pressure vessel having a size to fit in a usual home refrigerator. With the assembly of the invention, it is possible for the domestic fermenting of a fermentable liquid mixture for making beer under pressure and chilled conditions. The pressure vessel defines a closed fermentation chamber for containing a bath having an amount of fermentable liquid beer mixture effective to provide a pressurized atmosphere above the surface of the bath within the closed fermentation chamber during the fermenting process. A pressure relief valve maintains the pressure within the fermentation chamber at a level sufficient to provide safety conditions during the fermentation process. An output discharge mechanism includes a spigot and a float used to remove from the bath beer located adjacent the surface of the bath to draw beer from the pressurized vessel while a pressurized atmosphere remains in the vessel. The essence of the invention is that all of the fermentation process steps are effected in a single closed pressurized vessel without having to filter or provide separate carbonation after the fermentation process is completed.

12 Claims, 3 Drawing Sheets

FIG. IB

BEER MAKING METHOD

This is a continuation of application Ser. No. 800,863, filed Nov. 26, 1991 now abandoned, which is a continuation of U.S. patent application Ser. No. 07/442,305, filed Nov. 27, 1989 now abandoned.

This invention relates to a beer-producing apparatus and a method of making beer using the apparatus. More particularly, the invention relates to making beer in a pressurized or closed environment for the homebrewing trade.

BACKGROUND OF THE INVENTION

Beer has been made for many years by various well known techniques and by using various apparatuses for many years as is well known. In general, these techniques can be divided into commercial and homemaking methods. Commercial techniques produce consistent quality beer of various types but the price of such beer is high due to taxes and the like which are placed on the beer.

Homemaking beer is far less expensive than buying commercially available beer and has become increasingly popular as the price of commercially available beer continues to rise. Various techniques have been used to produce homemade beer but there are disadvantages with many.

The ingredients for the fermentation process for beermaking are notoriously old and well known and include malt, sugar, hops, water, yeast nutrients etc. as disclosed in U.S. Pat. No. 4,929,452 and British Patent 2,123,850A. Based on prior art knowledge as found in British Patent 2,123,850A, a carbonated beverage can only be obtained by directly fermenting under pressure, under chilled conditions, which the domestic operator generally cannot reasonably do. Any desired carbonation is performed commonly as a separate step after bottling the fermented brew. In general, homemade beer is made in an "open" system. That is, homemade beer is generally made under ambient or atmospheric conditions where the beer is exposed to the atmosphere. Making beer under these conditions allows oxygen to be absorbed into the beer. This can adversely affect shelf-life expectancy and flavor degradation. In addition, cleanliness is very important in making homemade beer and with the variety of containers, hoses and the like which inherently must be used in the process, the cleanliness requirement is troublesome. Yet a further disadvantage is that beer produced by homemade techniques is inconsistent in quality between batches. Because of these disadvantages, the homemade beer industry is not growing as robustly as might otherwise be the case.

SUMMARY OF THE INVENTION

The method of the invention is directed to a combination of process steps including fermenting a fermentable liquid mixture for making beer under pressure and under chilled conditions. The combination comprises providing a pressure vessel defining a closed fermentation chamber for containing a bath having an amount of fermentable liquid beer mixture sufficient to fit in a usual home refrigerator. The amount of fermentable liquid beer mixture is effective to provide a pressurized atmosphere above the surface of the bath within the closed fermentation chamber during the fermenting process.

A cold fermenting yeast is added to the bath in an amount sufficient to effect a fermentation process in the fermentable liquid mixture that increases the pressure within the pressure vessel. The pressure in the pressurized atmosphere is controlled within the closed fermentation chamber at a level sufficient to maintain safety conditions during use of the pressure vessel. The mixture contained within the closed chamber is placed in a usual home refrigerator and cooled to a temperature that exists in such a usual home refrigerator wherein the temperature is lower than ambient temperature outside the refrigerator.

When the beer is ready for consumption, a pressurized gaseous material is introduced into the pressure vessel to maintain a preselected pressure above the bath within the chamber. Once fermentation is complete, beer is removed from adjacent the surface of the bath at a draught pressure that is less than the pressure of the pressurized atmosphere in the pressure vessel.

The pressurized gaseous material used for maintaining the preselected pressure above the bath of beer is selected from the group consisting of carbon dioxide and inert gas. The inert gas may be nitrogen or any other gaseous material such as may be used in an aerosol container.

A particular feature of the disclosed method is that the pressurized gaseous material is introduced into the pressure vessel at a rate effective to produce no pressure spikes within the pressure vessel. Moreover, the pressurized gaseous material is introduced into the pressure vessel at a location above the surface of the bath.

In a specific embodiment, after the cold fermenting yeast is added, the pressure vessel is left at ordinary room temperature to allow completion of the initial phase of fermentation. Then the pressure vessel is placed within a usual home refrigerator until the fermentation process is complete and the beer is ready for consumption. The time and temperature for the initial phase of fermentation at ordinary room temperature is in the range of 3 to 4 days. The time for completing the fermentation process is within a 7 day period. The transparent character of the pressure vessel enables the user to monitor the process.

In a specific embodiment, the pressure of the atmosphere above the surface of the bath does not exceed 12 p.s.i and is maintained within the range of about 10 to 12 p.s.i. The draught pressure is at about 2 p.s.i.

Another feature of the invention is directed to an assembly for fermenting a fermentable liquid mixture for making beer under chilled pressure conditions. The assembly comprises a pressure vessel defining a closed fermentation chamber for containing a bath including an amount of fermentable liquid beer mixture sufficient to provide an upper surface on the bath within the closed chamber. The pressure vessel has a structural configuration effective to fit into a usual home refrigerator.

The pressure vessel includes ingredient inlet means for adding a cold fermenting yeast to the bath of fermentable liquid beer mixture. Pressure relief valve means controls the pressure within the fermentation chamber at a level sufficient to maintain safety conditions during fermentation process. Gas input valve means introduces pressurized gaseous material into the pressure vessel to maintain pressure above the chamber bath. Output discharge means is used to remove beer from adjacent the surface of the bath and to draw the beer from the pressure vessel while a pressurized atmosphere remains in the vessel.

In a specific embodiment, the ingredient inlet means includes an ingredient inlet opening in the pressure vessel above the surface of the bath. Ingredient inlet cap means covers the ingredient inlet opening after fermentation ingredients are introduced into the chamber. The ingredient inlet cap means includes the pressure release valve means for maintaining a selected pressure in the vessel by releasing gas from the pressurized atmosphere through the ingredient inlet opening.

Gas input valve means includes metering means for injection of gaseous material into the pressurized chamber at a rate effective to produce no pressure spikes within the pressure vessel. More particularly, the gas input valve means includes container means for holding a carbon dioxide cartridge, cartridge outlet piercing means for accessing the carbon dioxide in the cartridge, valve discharge opening means for discharging carbon dioxide at a controlled rate, and coupling means for directing the carbon dioxide from the carbon dioxide cartridge into the pressure vessel.

A further feature comprises output discharge means including a float member, discharge tubing means, and discharge valve means. The float member includes a beer inlet opening to receive beer from the bath at a location adjacent the surface of the bath. The discharge tubing means is connected at one end to direct beer from the beer inlet opening to a beer discharge opening located in the pressure vessel below the surface of the bath. The discharge valve means is disposed on the outside of the pressure vessel to draw beer from the bath.

A further feature of the discharge tubing means includes a draught tube having an inside diameter effective to produce a drawing pressure inside the tubing at a level below the atmospheric pressure within the pressure vessel. The pressure relief valve means is effective to maintain the atmospheric pressure above the surface of the bath within the pressure vessel at a maximum of 12 p.s.i. The draught tube is effective to produce a drawing pressure of about 2 p.s.i.

A feature of the invention is directed to an assembly comprising a pressure vessel having separable housing sections, a spigot mounted in one portion of said pressure vessel, a seal between said separable housing sections of said pressure vessel, a pressure relief valve mounted to said pressure vessel, and an inert gas producer to provide pressure within said pressure vessel.

The output discharge means includes the spigot, a float, and tubing means for removing beer from adjacent the surface of the bath and to draw the beer from the pressure vessel while a pressurized atmosphere remains in the vessel. The pressure relief valve is effective to release gas from the pressurized atmosphere naturally resulting from the fermentation process. The pressure vessel includes ingredient inlet means for introducing the fermentable liquid mixture into the chamber and adding a cold fermenting yeast to the bath of the fermentable liquid mixture. The upper housing section includes an ingredient inlet opening above the surface of the bath and ingredient inlet cap means to cover the inlet opening after the fermentation ingredients are introduced into the chamber.

The method of the invention comprises producing beer including the steps of combining a known premixed malt extract with water, adding a cold fermenting yeast to said mixture of premixed malt extract and water, applying a temperature relatively lower than ambient temperature to said mixture of premixed malt extract, water and cold fermenting yeast and allowing said mixture to ferment. The mixture of malt extract, water and cold fermenting yeast contained within the closed chamber is cooled to a temperature that exists in a usual home refrigerator wherein the temperature is lower than ambient temperature outside the refrigerator.

According to yet a further aspect of the invention, there is provided float apparatus comprising a float. The float of the output discharge means includes a beer inlet opening or entrance port in said float for allowing entry of liquid pressure. A tube extends from the entrance port to the spigot for transporting beer from the beer inlet opening of the float to a beer discharge opening in the pressure vessel at a location below the surface of the bath. The spigot is disposed on the outside of the vessel to draw beer from the bath.

A pressure dispenser constitutes gas input valve means for introducing pressurized gaseous material into the pressure vessel. The gas dispenser is disposed to input gaseous material under pressure through a gas input opening in the pressure vessel at a location above the surface of the bath. The gas dispenser includes metering means for injecting gaseous material into the pressurized vessel chamber at a rate effective to produce no pressure spikes within the pressure vessel.

In a specific embodiment, the pressure dispenser comprises a container means or housing operable to hold a pressurized gas dispenser. A cap is operable to be connected to the housing which includes a first chamber operable to hold pressure at a first pressure and a second chamber downstream of said first chamber operable to hold pressure at a second pressure, which is lower than said first pressure. A piston is effective to allow communication between said first and second chambers with the second chamber being in communication with the pressure vessel.

Other objects of this invention will appear in the following description and appended claims, reference being made to the accompanying drawings forming a part of the specification wherein like reference characters designate corresponding parts in the several views.

FIG. 1B is an enlarged fragmentary perspective view of the seal in relationship to upper and lower housing sections of the beer-making apparatus of FIG. 1;

DETAILED DESCRIPTION

Figure 1A:
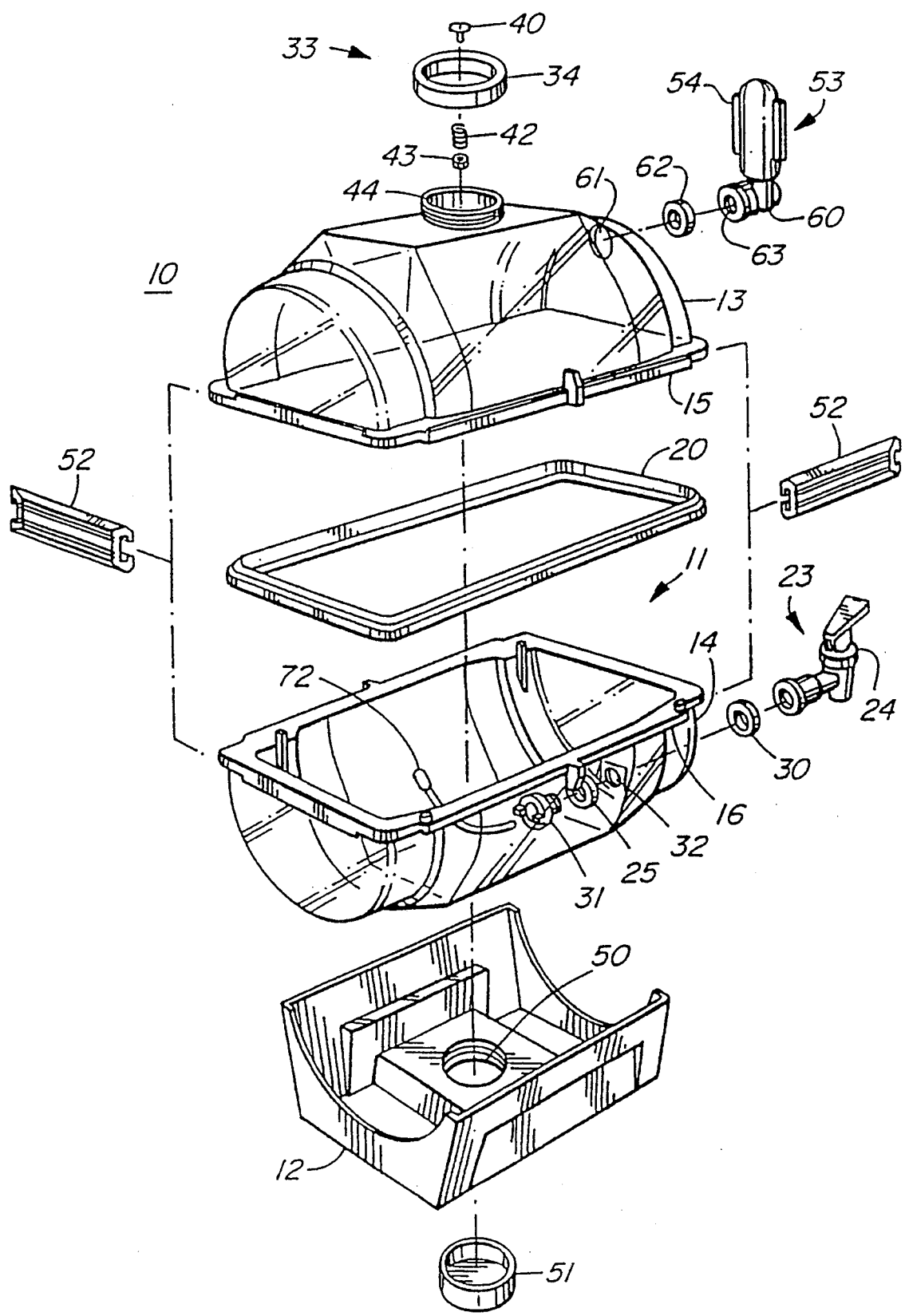
FIG. 1A is an exploded perspective view of the beer-making apparatus according to the invention.
Figure 2:
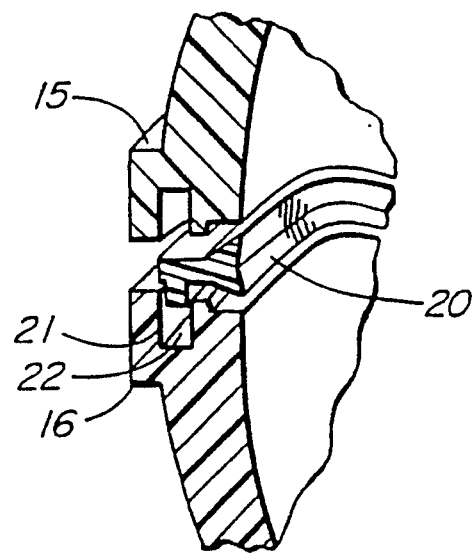
FIG. 2 is a sectional view of the carbon dioxide pressure valve of the beer-making apparatus of FIG. 1.
Figure 2:
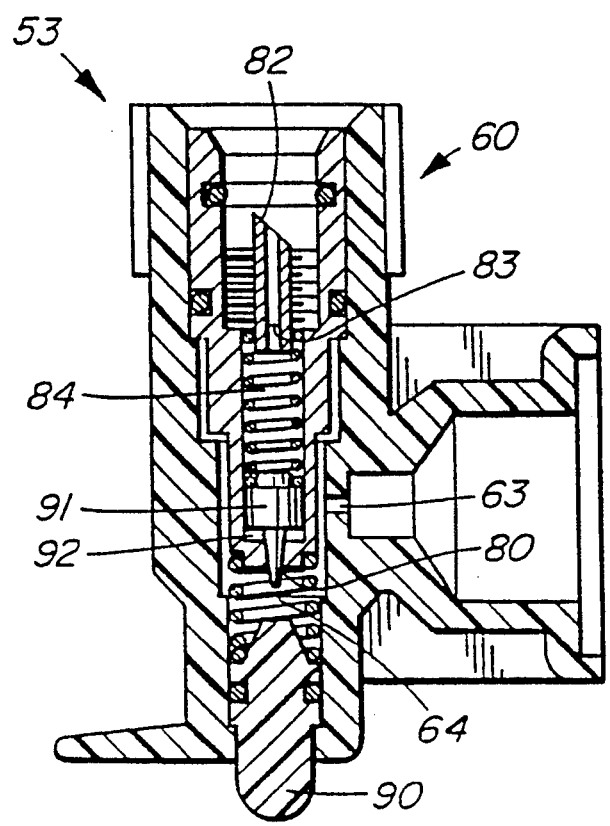

The beer-producing apparatus, generally designated 10 in FIGS. 1 and 2, comprises a pressure vessel, generally designated 11, and a base member 12. Pressure vessel 11 comprises two identical and separable housing sections. Upper housing section 13 and lower housing section 14 are made from a plastic material that does not have an affinity for esters present in beer and has a low oxygen permeation rate. In this specific embodiment, housing sections 13 and 14 are composed of a transparent acrylic plastic material. Thus, the bath within the closed chamber may be monitored during the fermentation process.

Some plastic materials such as polyethylene have an affinity for the esters present in beer and which can, therefore, damage the flavor of the beer being made. The plastic material used in housing sections 13 and 14 should have a low oxygen permeation rate to insure that the beer being made and carried in vessel 11 has a low flavor degradation.

A main seal 20 made of Monsanto SANTAPRENE or neoprene molded rubber is mounted between the upper and lower housing sections 13, 14. As shown in FIG. 1B, the main seal 20 extends completely around the periphery and between the upper and lower housing sections 13, 14. A protuberance 21 on the lower side of the seal 20 is disposed in a complementary recess 22 extending about the periphery of the lower housing section 14 in the assembled pressure vessel 11.

Rails 15, 16 extend completely around the periphery of the upper and lower case halves 13, 14, respectively.

A spigot, generally designated 23, is carried by the lower housing section 14. The spigot 23 comprises the dispenser 24, a first rubber washer 30 mounted between the outside of the lower housing section 14 and the spigot 23, a second rubber washer mounted between the inside of the lower housing section 14 and a spigot retainer nut 31 which threadedly engages spigot 23 through the lower housing section 14. A tube extends from the spigot 23 as described in greater detail below.

The dispenser part 24 of the spigot 23 is inserted through a hole 32 positioned in the lower housing section 14 with the first washer 30 mounted outside the pressure vessel 11 and the second washer between the spigot retainer nut 31 and the inside of the lower housing section 14. The spigot retainer nut 31 remains in position in the lower house section 14.

A top cap assembly is generally designated 33 comprises a top cap 34, a pressure safety release valve 40, a spring 42 adapted to provide the necessary predetermined tension to the pressure release valve 40 and a nut 43 adapted to retain the spring 42 on the pressure release valve 40. The top cap 34 is adapted to screw on to complementary threaded connection 44 on the upper housing section 13.

Lower 14 has a connection (not shown) identical to the connection 44 on the upper housing section 13. It extends through a hole 50 in base 12 and is closed and retained in the base 12 by a bottom cap 51.

Six plastic bar clamps 52 (only two of which are illustrated) are used as closure members between the upper and lower housing sections 13, 14. The bars 52 are positioned on all four sides of the pressure vessel 11, two on each longitudinal side and one on each end. They are adapted to slide over the rails 15, 16 in a tight fit such that seal 20 is compressed between the upper and lower housing sections 13, 14 and such that the upper and lower housing sections 13, 14 are held tightly together in a leak proof relationship.

A carbon dioxide dispenser, generally designated 53, comprises an upper removable cartridge housing 54 adapted to hold a carbon dioxide cartridge (not shown) and a lower valve stem housing 60. The carbon dioxide dispenser 53 is removably connected to the upper housing section 13 through hole 61 with retaining cap 61a.

Referring to FIG. 2, the lower valve stem housing 60 includes a metering orifice 63 extending into the pressure vessel 11 and a compression chamber 64 which feeds gas emitted from the carbon dioxide cartridge to the metering orifice 63 by the action of tapered pin 80 moving out of contact with its seat by valve stem 90. Metering orifice 63 is intended to allow only such quantity of carbon dioxide to pass as can easily be handled by the pressure safety relief valve 40 on the top cap assembly 33. The pressure used within the pressure vessel 11 has been satisfactory when it is of a value of 10–12 p.s.i.

Figure 3A:
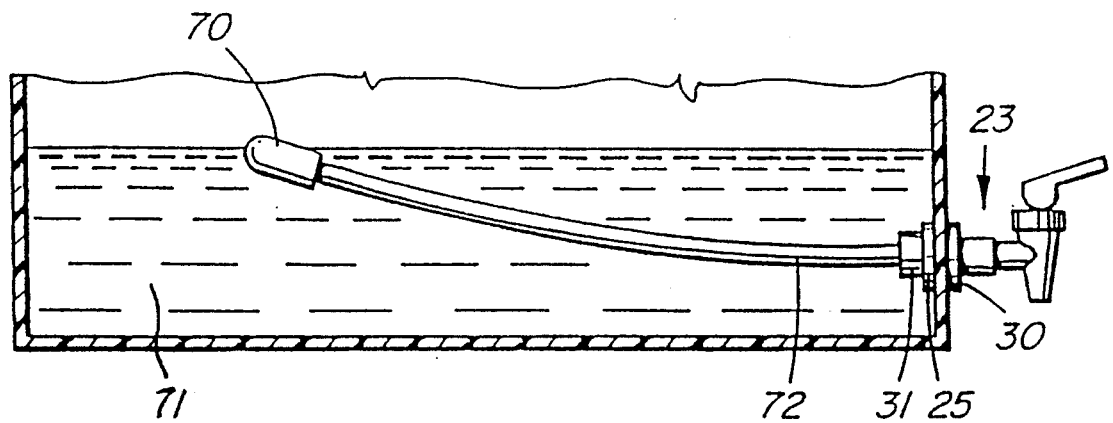
FIG. 3A is a diagrammatic illustration of the float in the liquid in the bottom portion of the container according to a further aspect of the invention.
Figure 3B:
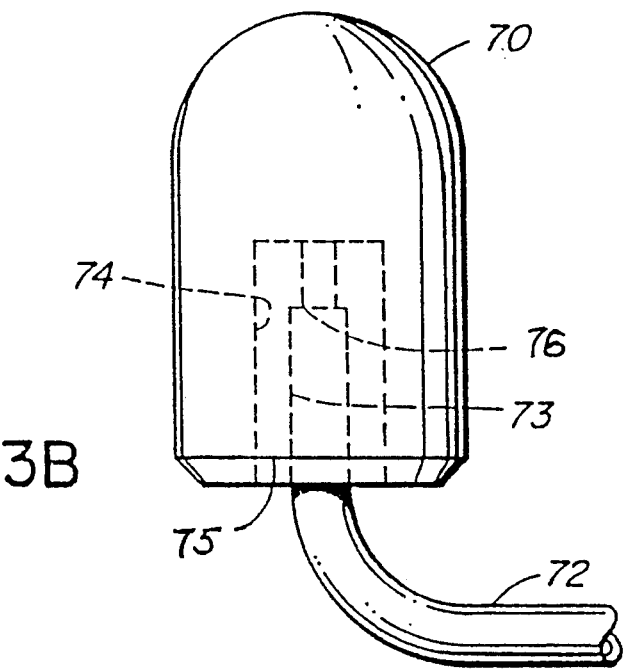
FIG. 3B is a diagrammatic and enlarged view of the float of FIG. 3A.

A float 70 is diagrammatically shown in FIGS. 3A and 3B as floating on or near the surface of the liquid bath 71 held in the pressure vessel 11. The float 70 is made from polypropylene material and has a specific gravity of approximately 0.996 or slightly less than one so that it floats slightly below the surface of the liquid bath 71. A tube 72 extends from the float 70 to the spigot 23 where it is inserted within a washer (not shown) within the spigot retaining nut 31. The float 70 has three ribs 73 (FIG. 3B) located equidistantly around and within the first diameter 74 of the float 70. They extend from the entrance port 25 to the end of the recess formed by the first diameter 74 and form a retaining ridge 26 which, when the tube 72 is inserted, prevents the tube 72 from contacting the end of the recess to allow the end of the tube 72 to be open to receive the beer from adjacent the surface of liquid bath 71 to be drawn from the pressure vessel 11.

OPERATION

In operation, the top cap 34 will be removed and a predetermined amount of known malt extract of approximately 1 quart is poured into the pressure vessel 11. Thereafter, a predetermined amount of water is added to the malt extract until the desired height of mixture is observed in the upper housing section 13 just below the $CO_2$ dispenser 53 in the pressure vessel 11. A cold fermenting yeast is then added to the mixture and the mixture is left to allow the fermentation process to begin.

As the fermentation process begins and continues, the carbon dioxide emitted from the mixture during the fermenting process will create a pressure within the vessel 11. It is intended for this pressure not to exceed 12 p.s.i. since the vessel 11 has been designed with this pressure in mind for safety reasons. If the pressure exceeds 12 p.s.i., the pressure release valve 40 is adapted to open under the restraining influence of spring 42 and allow the excess pressure to bleed to atmosphere.

Various durations of fermentation as desired by the operator may be utilized. It has been found, however, that a fermentation duration of three (3) or four (4) days at ordinary room temperature is satisfactory to substantially complete the initial phase of fermentation. Following the initial phase of fermentation, the brewing apparatus 10 is placed within a usual home refrigerator where the fermentation process will continue because of the cold fermentating yeast used although on a reduced scale. It has been found that the fermentation activity, as viewed through the transparent vessel 11, will be substantially completed in a seven day period.

Following the completion of the fermentation process, the beer is ready for consumption and, to that end, the operator will insert a carbon dioxide cartridge into the cartridge housing 54 and screw the cartridge housing 54 down onto the lower valve stem housing 60 until the membrane in the cartridge is pierced by pin 82. This will allow carbon dioxide to be emitted from the cartridge and through the orifice 83 and into a first chamber 84. The operator will subsequently press the valve stem 90 upwardly as viewed in FIG. 2 until the piston 91 is removed from the O-ring 92 which surrounds the piston 91 and seals the second compression chamber 64 from the first chamber 84.

Carbon dioxide will flow from the first chamber 84 to second chamber 64 and, thence, through orifice 63 and into the pressure vessel 11 at a rate effective to produce no pressure spikes in the pressure vessel and such that the pressure safety relief valve 40 is adequate to handle the release of any pressure over approximately 10–12 p.s.i.

The beer bath 71 in the pressure vessel 11 will, due to the pressure to which it is subject, flow upwardly within the recess extending from the entrance port 25 of the float 70 and into the open end of tube 72 where it will flow to the spigot 23. The use of the tube 72 having a reduced diameter allows the pressure of the beer bath 71 to be reduced as it flows through the tube 72 to the spigot 23. Whereas the atmospheric pressure within the pressure vessel 11 is approximately 10–12 p.s.i., the pressure of the beer drawn from bath 71 at the spigot 23 will be approximately 2 p.s.i.

The handle 24 of the spigot 23 will subsequently be operated to allow the beer to exit the vessel 11 to the user under the influence of the pressure in the pressure vessel 11 caused by the carbon dioxide.

Following the consumption of the brewed beer, the entire apparatus is easily disassembled. The bottom cap 51 is removed from the lower housing section 14 and the top cap assembly 33 is removed from the upper housing section 15. The base 12 is removed from the lower case half 14. The plastic slide bars 52 are slidably removed from the rails 15, 16 and the seal 20 is removed from the recess 22 in the lower case half 14. The spigot 23, the carbon dioxide dispenser 53 and float 70 are likewise removed and easily disassembled. The beer making apparatus 10 can then be easily cleaned and reassembled for its next use.

Preferably, the pressure vessel 11 is made from an acrylic plastic although other materials could, of course, be used. Although carbon dioxide has been found to be suitable for use in dispensing the beer, an inert gas such as nitrogen could also be used. Further, although a cartridge of carbon dioxide has also been indicated as suitable, an aerosol container appropriately designed could also be used.

Many modifications will readily occur to those skilled in the art to which the invention relates and the specific embodiments described should be considered illustrative of the invention only and not as limiting its scope as construed in accordance with the accompanying claims.

What is claimed is:

1. In a method of fermenting a fermentable liquid mixture for making beer under pressure and under chilled conditions, the combination of process steps comprising:
    a) providing a pressure vessel defining a closed fermentation chamber for containing a bath for effecting a fermentation process and having an amount of fermentable liquid beer mixture sufficient to fit in a usual home refrigerator,
    b) said amount of fermentable liquid beer mixture being effective to provide a pressurized atmosphere above the surface of the bath within the closed fermentation chamber during the fermenting process,
    c) adding a fermenting yeast to the bath in an amount sufficient to effect the fermentation process in the fermentable liquid mixture thereby increasing the pressure within the pressure vessel,
    d) controlling the pressure in the pressurized atmosphere within the closed fermentation chamber at a level sufficient to maintain safety conditions during use of the pressure vessel,
    e) placing the pressurized pressure vessel with the bath in a usual home refrigerator to cool the mixture contained within the pressurized closed chamber to a temperature that exists in a usual home refrigerator wherein said temperature is lower than ambient temperature outside the refrigerator,
    f) when the beer is ready for consumption, introducing a pressurized gaseous material into the pressure vessel to maintain a preselected pressure above the bath within the chamber,
    g) said pressurized gaseous material is selected from the group consisting of carbon dioxide and an inert gas, and
    h) removing from the bath beer located adjacent the surface of the bath at a draught pressure that is less than the pressure of the pressurized atmosphere above the surface of the bath.

2. A method as defined in claim 1 wherein the pressure of the atmosphere above the surface of the bath is maintained within the range of about 10 to 12 p.s.i.

3. A method as defined in claim 1 wherein the pressure of the atmosphere above the surface of the bath does not exceed 12 p.s.i.

4. A method as defined in claim 1 wherein the draught pressure is about 2 p.s.i.

5. A method as defined in claim 1 wherein the inert gas is nitrogen.

6. A method as defined in claim 1 wherein the pressurized gaseous material is carbon dioxide.

7. A method as defined in claim 1 wherein the pressurized gaseous material is introduced into the pressure vessel at a rate effective to produce no pressure spikes within the pressure vessel.

8. A method as defined in claim 1 wherein the pressurized gaseous material is introduced into the pressurized vessel at a location above the surface of the bath.

9. A method as defined in claim 1 wherein said fermenting yeast is cold fermenting yeast, and after the cold fermenting yeast is added, the bath is maintained at ordinary room temperature for a time sufficient to allow completion of an initial phase of fermentation, and then the pressure vessel is placed within a usual home refrigerator until the fermentation process is complete and the beer is ready for consumption.

10. A method as defined in claim 9 wherein the time at temperature for the initial phase of fermentations at ordinary room temperature is in the range of 3 to 4 days.

11. A method as defined in claim 9 wherein the time for completing the fermentation process is within a seven day period.

12. A method for fermenting a fermentable liquid mixture for making beer under pressure and chilled conditions, a combination of process steps comprising:
    a) providing a pressure vessel defining a closed fermentation chamber for containing a bath for effecting a fermenting process and having an amount of fermentable liquid beer mixture sufficient to fit in a usual home refrigerator, b) said amount of fermentable liquid beer mixture being effective to provide a pressurized atmosphere above the surface of the bath within the closed fermentation chamber during the fermenting process, c) adding a fermenting yeast to the bath in an amount sufficient to effect the fermenting process in the fermentable liquid mixture thereby increasing the pressure within the pressure vessel, d) controlling the pressure in the pressurized atmosphere within the closed fermentation chamber at a level sufficient to maintain safety conditions during use of the pressure vessel, e) after the fermenting process is maintained in the bath for a period of time at ambient temperature, placing the pressurized pressure vessel with the bath in a usual home refrigerator to cool the mixture contained within the pressurized closed chamber to a temperature that exists in a usual home refrigerator wherein said temperature is lower than ambient temperature outside the refrigerator, f) when the beer is ready for consumption, introducing a pressurized gaseous material into the pressure vessel to maintain a preselected pressure above the bath within the chamber, and g) removing from the bath beer located adjacent the surface of the bath at a draught pressure that is less than the pressure of the pressurized atmosphere above the surface of the bath.

* * * * *